United States Patent [19]

Mufti

[11] 4,120,199
[45] Oct. 17, 1978

[54] HYDROCARBON REMOTE SENSING BY THERMAL GRADIENT MEASUREMENT

[75] Inventor: Irshad R. Mufti, Tulsa, Okla.
[73] Assignee: Standard Oil Company (Indiana), Chicago, Ill.
[21] Appl. No.: 776,345
[22] Filed: Mar. 10, 1977
[51] Int. Cl.² .............................................. E21B 47/00
[52] U.S. Cl. .................................................... 73/154
[58] Field of Search ......................................... 73/154
[56] References Cited
U.S. PATENT DOCUMENTS

| | | | |
|---|---|---|---|
| 1,901,431 | 3/1933 | Bond | 73/154 X |
| 2,301,326 | 11/1942 | Reistle | 73/154 |
| 2,403,704 | 7/1946 | Blau | 73/154 X |

*Primary Examiner*—Herbert Goldstein
*Attorney, Agent, or Firm*—Albert C. Metrailer; Arthur McIlroy

[57] ABSTRACT

A method for indicating the proximity of a hydrocarbon reservoir by measurements of thermal gradients in dry holes. Due to the lower thermal conductivity of hydrocarbon-containing rock, the thermal gradients within such rock are abnormally high when compared to normal subsurface thermal gradients and the anomaly extends well beyond the boundaries of the reservoir. Geothermal gradients are measured along the entire length of deep boreholes, which have proved to be dry, or in shallow test boreholes. A comparison of the shape of such gradient curves to theoretical curves indicates the presence of a hydrocarbon deposit spaced laterally from a deep dry hole or below a shallow surface test hole.

7 Claims, 4 Drawing Figures

HYDROCARBON REMOTE SENSING BY THERMAL GRADIENT MEASUREMENT

BACKGROUND OF THE INVENTION

This invention relates to the field of exploring for hydrocarbon deposits and more particularly to a method for indicating the proximity of a hydrocarbon deposit to a dry hole by means of measurement of thermal gradient in the dry hole.

It is generally well-known that heat flows from the inner portions of the earth to its surface in a generally uniform manner over the entire surface of the earth. Various measurements of the heat flow and variations in the heat flow at the earth's surface have been made in efforts to determine the structure of the earth's crust and even to explain the earth's origin. A detailed example of the attempts to measure the earth's heat flow by measurement of borehole temperatures and rock conductivity may be found in the publication entitled "Heat Flow and Precision Temperature Measurements in Boreholes" by John K. Costain and Phillip M. Wright, published by the SPWLA Tenth Annual Logging Symposium, May 25, 1969. The work described in this publication involves making precision temperature measurements in a borehole at a number of locations to determine the temperature gradient along the borehole. Conductivity of rock samples taken from the borehole was then measured under laboratory conditions. The gradient and conductivity values were then combined to estimate actual heat flow toward the earth's surface.

Another method of measuring heat flow in a borehole is illustrated by U.S. Pat. No. 3,808,889, issued to Rawson et al., on May 7, 1974. The Rawson device employs a solid-state thermopile incorporated into a logging sonde to provide electrical indications of the value of heat flowing through the device. This device is an example of apparatus for measuring heat flow and/or thermal gradient without the use of multiple temperature elements.

Another patent relevant to this field of interest is U.S. Pat. No. 3,864,969, issued to Smith, Jr., on Feb. 11, 1975. This device primarily is intended for measurement of earth formation thermal conductivity. The device includes means for coupling known quantities of heat to a station in the borehole and temperature-sensing elements for measuring the temperature rise caused by the heat. Thermal conductivities measured by the device are used to distinguish fresh-water-filled earth formations from hydrocarbon-filled earth formations. As noted in the background section of this patent, temperature logs taken by means of two high-resolution thermometers have been used in the past to detect casing leaks and fluid flow behind the casing. Such fluid flow almost always changes the temperature in the borehole from the normal formation temperature.

Thus it is seen that methods are known for measuring temperature, temperature gradient, thermal conductivity, and heat flow in a borehole but that such measurements have not been used in the exploration for hydrocarbon deposits missed by a borehole.

SUMMARY OF THE INVENTION

Accordingly, an object of the present invention is to provide a method for exploring for hydrocarbon deposits by means of thermal gradient borehole measurements.

According to the present invention, thermal gradients are measured in one or more exploratory boreholes and plotted versus depth in the borehole. The plots are then inspected and compared to synthetically generated curves to provide an estimate of distance to and, when a plurality of boreholes is used, direction of a low thermal conductivity anomaly such as a hydrocarbon deposit. Alternatively, thermal gradient measurements taken at a given depth in a number of boreholes are plotted on a surface map to indicate the positions of a hydrocarbon deposit located below the depth of measurement.

BRIEF DESCRIPTION OF THE DRAWINGS

The present invention may be more fully understood by reading the following description of the preferred embodiment with reference to the accompanying drawings wherein.

DESCRIPTION OF THE PREFERRED EMBODIMENT

While borehole measurements of thermal gradient have been used in the prior art for detection of borehole problems such as fluid leaks, I have discovered that such measurements may also be used as a means for exploring for hydrocarbon deposits missed by the borehole. In particular, I have discovered that earth formations containing hydrocarbons generate thermal gradient anomalies which extend laterally beside the formations and vertically above the formations nearly to the earth's surface. I have found that the thermal conductivity contrast between actual rock containing hydrocarbons and rock containing water in place in the earth is higher than estimated from laboratory measurements of such rock samples. For this reason, thermal gradient anomalies are much larger than would have been predicted based on early teachings concerning conductivity contrast. Such anomalies therefore extend substantial distances beyond the actual low-conductivity zones and when detected act as indicators of the proximity of a low-conductivity zone such as a hydrocarbon deposit.

Figure 1:
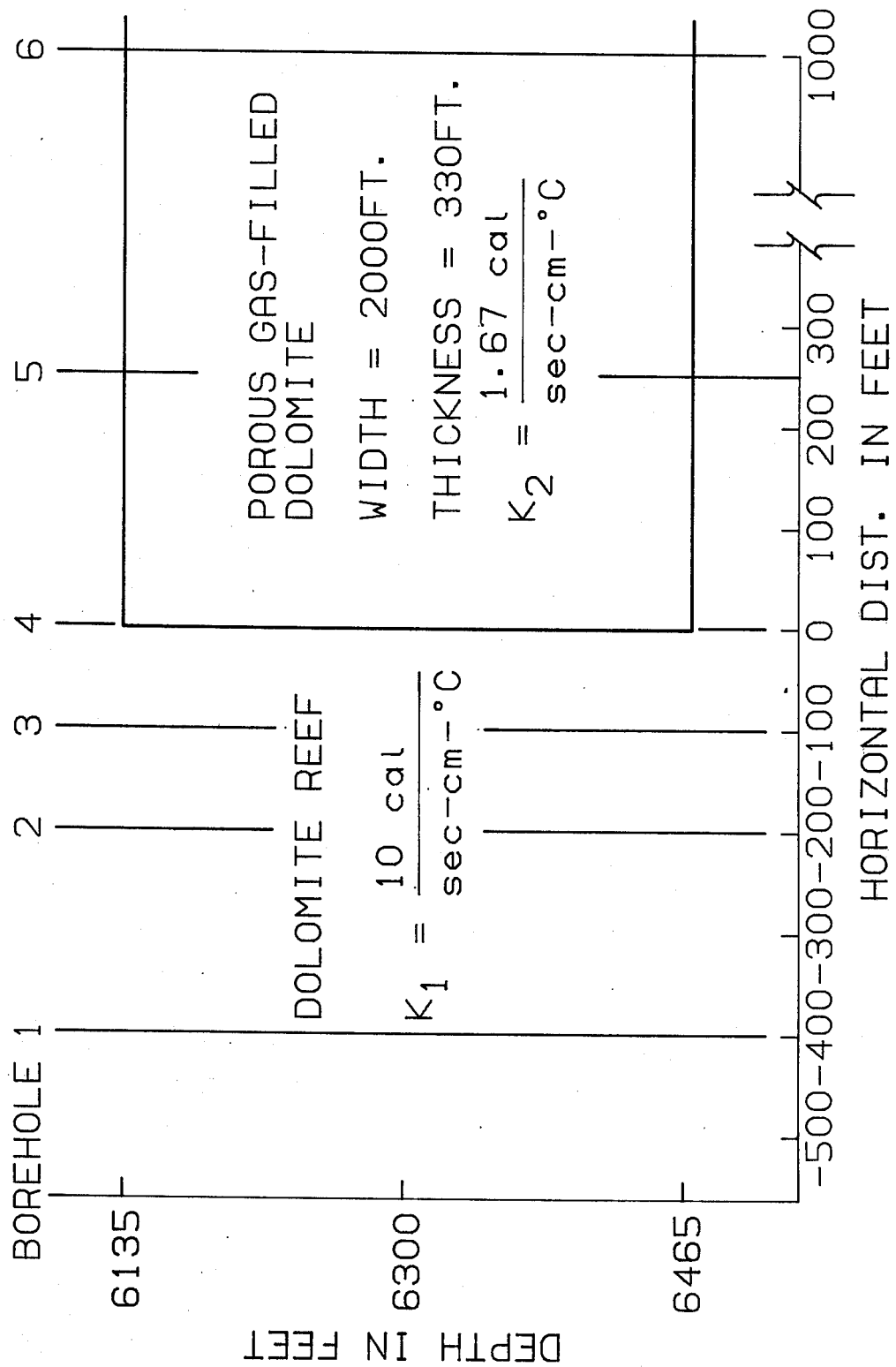
FIG. 1 is a cross-sectional illustration of an idealized hydrocarbon-filled formation contained within an otherwise uniform portion of the earth.

The nature of the anomaly will be explained by means of a synthetic model of a gas-filled region located within an otherwise uniform earth. FIG. 1 illustrates one end of a porous gas-filled dolomite formation located within an otherwise water-filled dolomite region. In this model the gas-filled region is 330 ft thick and has a total width of 2000 ft, with only 1000 ft of the formation illustrated for simplicity. The vertical center of the gas-filled formation is located at a depth of 6300 ft below the earth's surface. Also illustrated in FIG. 1 are boreholes 1 through 6 with their positions indicated relative to the edge of the gas-filled formation. Simulated logs from these boreholes are illustrated in FIGS. 3 and 4.

Figure 2:
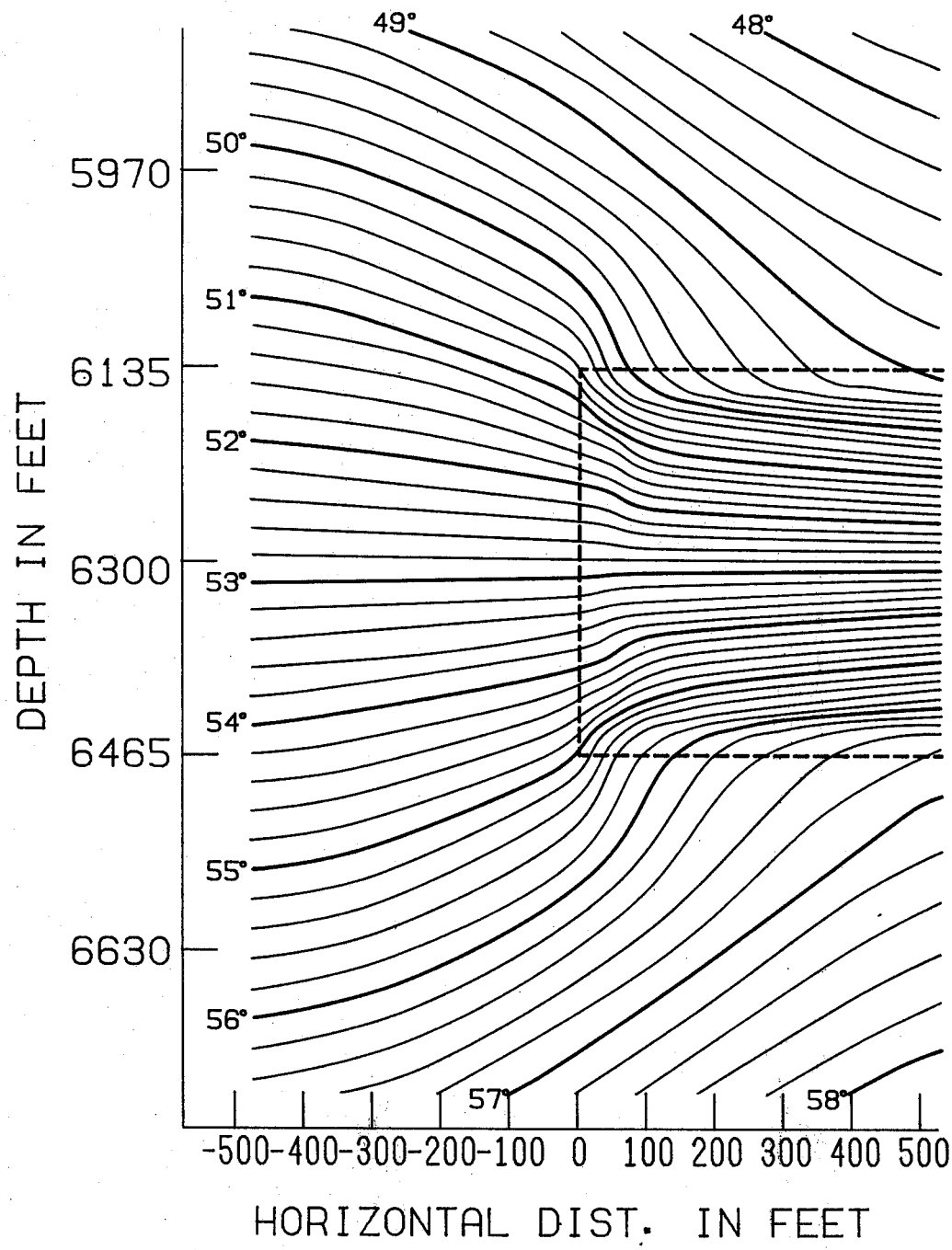
FIG. 2 is a synthetically generated isothermal plot of the formation illustrated in FIG. 1.

FIG. 2 is a synthetic isothermal plot for a portion of the gas-filled formation and surrounding water-filled formation illustrated in FIG. 1. The temperatures shown in FIG. 2 are in degrees Centigrade and distance scales are provided to allow correlation with FIG. 1. This isothermal plot is the basis for the synthetic logs of temperature and gradient data shown in FIGS. 3 and 4.

Figure 3:
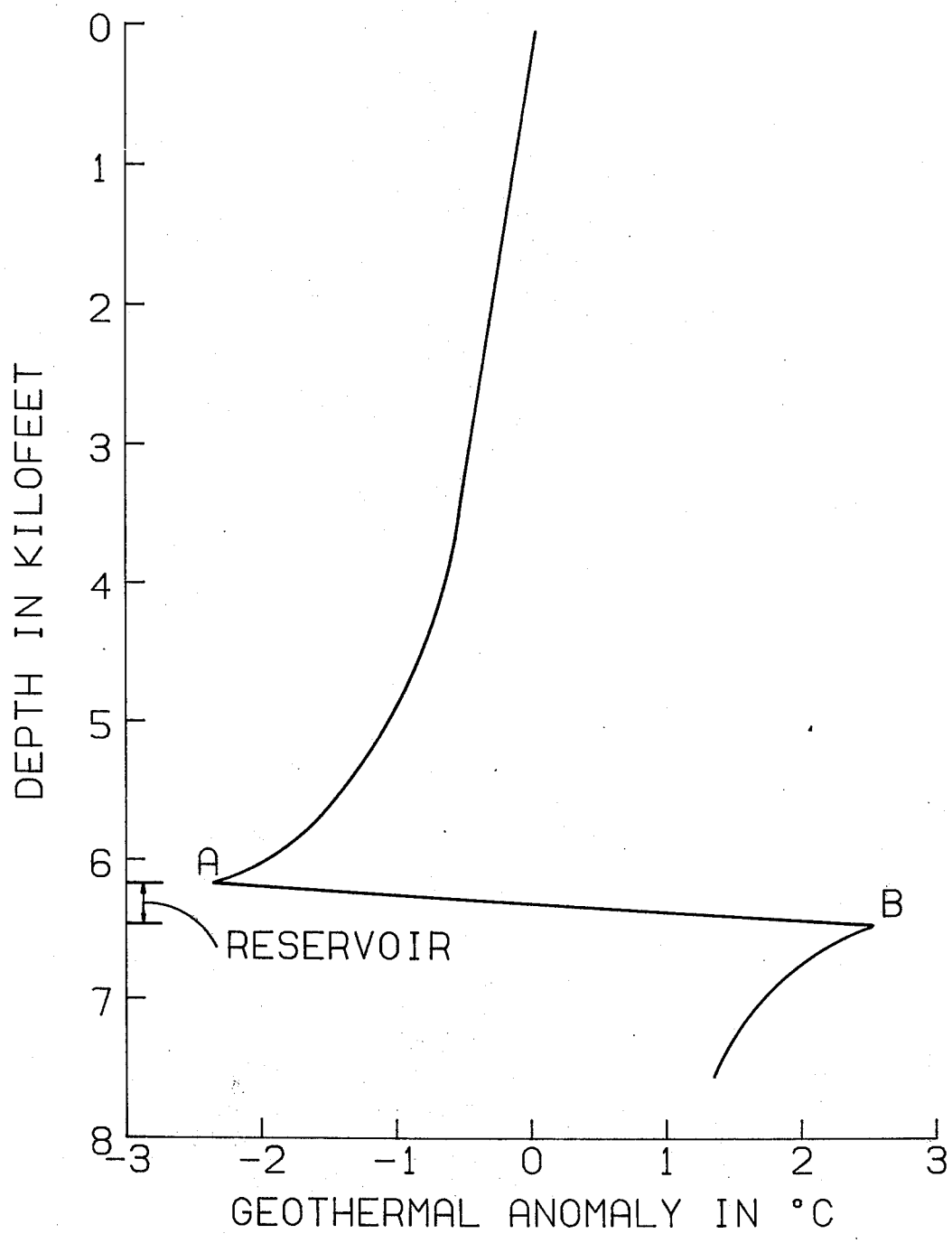
FIG. 3 is a plot of the geothermal anomaly which would be measured by a thermal log run in Well No. 5, illustrated in FIG. 1.

FIG. 3 is a plot of thermal anomaly measured in borehole 5 versus depth. By thermal anomaly is meant the difference between the actually measured temperature at a given depth and the temperature which would be expected at the same depth in a borehole far to the left of borehole 1 in FIG. 1, that is, in a borehole unaffected by the hydrocarbon deposit. This plot 10 of FIG. 3 illustrates that the thermal anomaly associated with the formation 8 of FIG. 1 extends essentially continuously to the earth's surface. The effect approaches zero near the earth's surface and, of course, would usually be difficult to detect within the top 50 feet of the earth's surface due to noise introduced by seasonal temperature variations.

Figure 4:
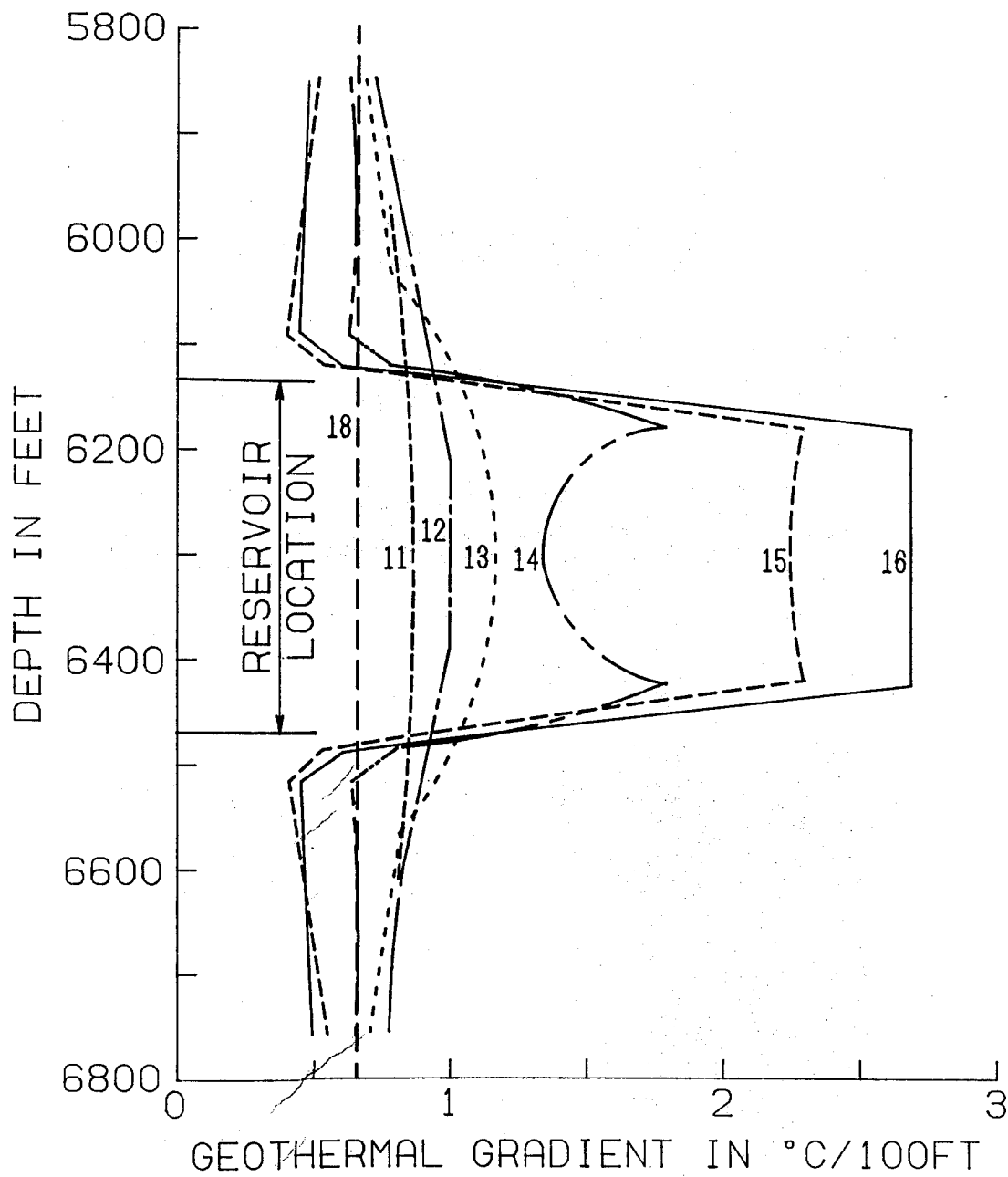
FIG. 4 is a plot of geothermal gradient versus depth, which would be generated by performing a thermal gradient logging operation in each of the wells illustrated in FIG. 1.

FIG. 4 is a plot of geothermal gradients which would be measured in all six boreholes illustrated in FIG. 1 over a 1000-ft interval centered on the gas-filled portion of the formation, that is 6300 ft. Curves 11, 12, 13, 14, 15, and 16 are the gradients which would be measured in boreholes 1 through 6, respectively. The straight line 18 is the regional or normal gradient which would be measured in a borehole which was in a uniform portion of the earth near no anomaly. It can be seen by inspecting FIG. 4 that each of the logs 11 through 16 is the sum of line 18 and an anomaly caused by the low thermal conductivity of the gas-filled portion of the formation. In other words, the regional thermal gradient acts as a baseline or simply shifts each of the curves 11 through 16 away from the zero point on the geothermal gradient axis without changing the shape of the curves. This is one of the features of a gradient log which makes it useful in the field of exploration. The absolute values of the measured thermal gradients can in essence be ignored, since it is the relative shapes of the curves which indicate the proximity of a low conductivity anomaly to a borehole.

For example, borehole 1 of FIG. 1, which is the farthest from the boundary of the hydrocarbon-containing region, produces curve 11 of FIG. 4. Curve 11 shows a peak thermal gradient precisely at the center of formation 8, that is, at 6300-ft depth, with a decreasing gradient both above and below this depth which approaches the regional gradient 18. Curve 12, generated from borehole 2 of FIG. 1, likewise has a peak at the depth of the center of the gas-filled formation decreases symmetrically above and below the formation. The gradient log 13, taken in borehole 3 of FIG. 1, shows an even higher gradient peak at the 6300-ft level and decreasing gradients above and below. In the synthetic model, boreholes 1, 2, and 3 all are dry holes which missed the hydrocarbon-filled formation. The peak gradients measured in each of these boreholes shows progressive increases as the edge of the formation is approached.

Curve 14 of FIG. 4 is generated from borehole 4 of FIG. 1, which passes precisely at the edge of the gas-filled formation. Curve 14 has distinct characteristics distinguishing it from curves 11, 12, and 13. Curve 14 has two peaks at approximately the upper and lower boundaries of the gas-filled formation with a minimum whose depth corresponds to the center of the formation. In addition, at depths just above and below the gas-filled formation, curve 14 has low points at which the gradient becomes less than the regional gradient. The gradient curve 14 increases in value and asymptotically approaches the regional gradient at greater distances above and below the formation. Gradient plot 15, taken from borehole 5 of FIG. 1, which passes through the formation near its edge, also exhibits a double peak but with a less pronounced minimum in the middle. Curve 15 also drops below the regional gradient both above and below the formation and then approaches the regional gradient from a lower value at greater distances above and below the formation. Gradient curve 16 is generated from borehole 6 which passes through the precise center of the gas-filled formation. As a result, curve 16 has a perfectly flat peak having the highest value of any of the curves illustrated. The gradient curve 16 then drops below regional gradient above and below the formation and slowly approaches the regional value from a lower value at greater distances above and below the formation.

In practice, the first step of the process, according to the present invention, is to measure the thermal gradients in exploratory or otherwise dry boreholes. Ideally, the gradient measurement is a point measurement and is not simply the difference in temperature at two widely spaced points in the borehole. In practice, even devices such as disclosed in the above-referenced U.S. Pat. No. 3,808,889, which uses a small solid-state device to measure heat flow, must make thermal contacts to the borehole at points spaced at least several feet apart. In a similar fashion, the devices which use two temperature-sensitive elements must have these elements spaced far enough apart to provide a reasonably large temperature difference in order to provide reasonable accuracy. It is desirable that the spacing on any device be smaller than the thickness of the formations which are to be detected to prevent loss of detail in the gradient curves. Regardless of which type of logging instrument is used, a gradient log plotted versus depth for each dry hole in a given exploration area is plotted in a manner similar to that in FIG. 4. If there is no thermal conductivity anomaly within the region around a borehole, either laterally or below it, essentially vertical straight lines shall result, such as curve 18 in FIG. 4.

It is the vertical characteristic of line 18 which indicates that no anomaly of limited horizontal extent is nearby. In the model of FIG. 1 the earth outside the gas-filled zone is considered to be vertically uniform and, as a result, curve 18 is straight as well as vertical. In the more normal case the earth is stratified, that is, made up of numerous thin layers of material having differing thermal conductivity but having essentially infinite lateral dimensions. As stated above, the heat flow from the earth is also generally uniform. As a result, the thermal gradient within any given strata is constant and would plot as a vertical straight line on FIG. 4. But the gradient of each layer is different from other layers in proportion to the difference in thermal conductivity of the layers. Thus, normally curve 18 is made of a number of vertical straight-line segments displaced from each other on the thermal gradient scale. Just as the offset of curve 18 is part of each of the curves 11 through 16, a real curve containing offsets between various strata would also be part of real curves of gradient. The shapes illustrated by curves 11 through 16 of FIG. 4 are therefore illustrative of the anomaly caused by a hydrocarbon-containing anomaly of limited lateral extent. Where, as in FIG. 4, a plot is made of a limited subsurface zone, in this case 5800 to 6800 feet in depth, it is reasonable to expect only a few strata interfaces to occur so that curve 18 would be both vertical and nearly straight. In other words, if plots are made of gradient for each separate stratum, which may be identified by other logs, then within each plot the baseline curve would, in fact, be straight and vertical, since no interfaces would be included. Separate plots for each of the strata are not recommended, due to the smearing of interfaces caused by finite spacing in the measurement device, which is easier to identify on a large-scale plot.

In the case of a dry hole displaced laterally from a hydrocarbon-containing formation, curves similar in shape to Curves 11, 12, and 13 of FIG. 4 can be expected, since these correspond to the boreholes 1, 2, and 3 of FIG. 1, which miss the gas-filled portion of the formation entirely. Thus, if a gradient log taken in a dry hole exhibits a peak value at a given depth and decreases at shallower and deeper positions approaching a line corresponding the regional gradient, this is an indication of a possible hydrocarbon-containing zone at the depth of the peak and laterally displaced in an unknown direction from the borehole. Comparison of thermal gradient logs from a number of boreholes in a given region can then be made to determine which ones have the highest peaks and thus appear to be closest to the source of thermal anomaly. In this way, a direction indication can be obtained.

In some cases it may occur that a dry hole missed a hydrocarbon-containing region simply by not being drilled deep enough. In such a case, a thermal gradient curve showing either a positive increasing or negative decreasing value of gradient relative to the regional gradient is an indication of the hydrocarbon region below the bottom of the borehole. The positive or negative character of the deviation is an indication of whether the borehole is directly over the formation or laterally displaced from the formation as well as not being drilled to the same depth as the formation. These conditions can be seen by considering that portion of FIG. 4 which is above the 6000-foot depth point. Curves 11, 12, and 13 have a value greater than the reginal gradient, and the difference increases with depth. Curves 15 and 16, corresponding to boreholes directly above a portion of the gas-filled formation, have a value lower than the regional gradient and the difference again increases with depth. Thus, all the curves have a slope (that is, are not vertical) and have gradient values greater than or less than regional values, depending on whether the borehole is laterally displaced from or directly over the hydrocarbon deposit. Again, a number of readings in wells in an area can give a directional indication of the location of the low conductivity anomaly.

It is apparent that since as illustrated in FIG. 3 the temperature and gradient anomalies extend to the earth's surface, it may be practical in some cases to drill a number of shallow test holes in an area to be explored simply for the purpose of mapping temperature gradients. The primary consideration in such a case is that the depth of measurements be such that surface diurnal and seasonal temperature changes should have no effect on the readings. Surface seasonal effects rearly extend more than 50 ft below the earth's surface, so that readings taken in the 50- to 100-ft region are usually accurate enough. Even shallower boreholes can be used when a set of readings can be made in a short enough time period that seasonal changes can be ignored. Such shallow drilling can be done with small portable drill rigs at much less expense than is required in drilling an actual exploratory hole. This surface mapping variation of the gradient plots of FIG. 4 becomes practical when a number of shallow masurements are taken as long as at least one gradient measurement is made at the same depth in each borehole. For example, if the temperature gradient is measured at a depth of 100 feet in a number of boreholes in an area of exploration, equal gradient value curves may be generated and drawn on a map of the area. As noted above, the gradients vertically above a hydrocarbon deposit are lower than normal; and gradients just outside of a deposit are higher than normal. As a result, a gradient map based on point gradient measurements at a given depth will ideally show a ring of higher-than-normal gradients around a region of lower-than-normal gradients, with the ring outlining a low-conductivity zone, such as a hydrocarbon deposit. While shallow-hole observations will remote-sense anomalies originating within only limited depths, the limited are primarily a matter of accuracy and sensitivity of the detecting equipment. At present, it is believed that the available equipment when used near the earth's surface should be able to detect anomalies at up to 4000 ft in depth.

While in the above description of the preferred embodiments a low-conductivity anomaly has been used, it is apparent that similar results can be obtained with a high-conductivity anomaly, such as a metallic mineral deposit. In such a case, essentially all of the curves illustrated would be reversed; in other words, they will exhibit high-temperatures and gradients, where the present drawings show low-temperatures and gradients. The high-conductivity anomaly would have lower-than-normal gradient within its boundaries and extending laterally beyond it, and higher temperatures and gradients above.

While the present invention has been illustrated in terms of specific methods, it is apparent that modifications can be made within the scope of the invention, as defined in the appended claims.

What is claimed is:

1. A method of exploring for hydrocarbon deposits from a borehole in the earth which does not penetrate a hydrocarbon deposit, comprising;
   measuring temperature gradient at a plurality of depths along at least a portion of a borehole which does not penetrate a hydrocarbon deposit,
   plotting the measured values of temperature gradient versus depth, and
   inspecting the plot of temperature gradient versus depth to infer proximity of a region having unusually low thermal conductivity and limited lateral extent.

2. A hydrocarbon exploration method according to claim 1 wherein temperature gradient is measured by measuring temperature at a plurality of borehole positions having known vertical spacing.

3. A hydrocarbon exploration method according to claim 1 wherein proximity of a low-conductivity region is inferred by the occurrence of continuous change of temperature gradient with depth.

4. A hydrocarbon exploration method according to claim 1 wherein proximity of a low-conductivity region laterally spaced from the borehole is inferred by occurrence of a peak in the plot of temperature gradient versus depth.

5. A hydrocarbon exploration method according to claim 1, further including the steps of:

measuring temperature gradient at a plurality of depths in a second borehole which does not penetrate a hydrocarbon deposit;

plotting the additionally measured gradient values versus depth;

inspecting the plot of temperature gradient versus depth for the second borehole to infer proximity of a region having unusually low thermal conductivity and limited lateral extent; and comparing the plots of temperature gradient versus depth to infer the direction of a region having unusually low thermal conductivity and limited lateral extent relative to the boreholes.

6. A method of exploring for hydrocarbon deposits from boreholes in the earth which do not penetrate a hydrocarbon deposit, comprising:

measuring temperature gradient across a short interval at a preselected depth in a plurality of boreholes;

plotting the measured gradient values on a surface map of the borehole locations; and inspecting the plot of gradient values to infer proximity of a region of low thermal conductivity.

7. A hydrocarbon exploration method according to claim 6 wherein proximity of a region of low thermal conductivity is inferred by occurrence of a region of lower than normal temperature gradients within a region of higher than normal temperature gradients.

* * * * *